(12) United States Patent
Bostick (10) Patent No.: US 11,987,387 B2
(45) Date of Patent: May 21, 2024

(54) SYSTEM AND METHOD FOR PROVIDING ELECTRICAL POWER TO A TETHERED AERIAL VEHICLE

(71) Applicant: PEGAPOD LLC, Chantilly, VA (US)

(72) Inventor: Randall Bostick, Aldie, VA (US)

(73) Assignee: PEGAPOD LLC, Chantilly, VA (US)

( * ) Notice: Subject to any disclaimer, the term of this patent is extended or adjusted under 35 U.S.C. 154(b) by 0 days.

(21) Appl. No.: 17/812,963

(22) Filed: Jul. 15, 2022

(65) Prior Publication Data
US 2022/0355953 A1      Nov. 10, 2022

Related U.S. Application Data

(63) Continuation of application No. 17/541,649, filed on Dec. 3, 2021, now Pat. No. 11,420,771.

(60) Provisional application No. 63/149,660, filed on Feb. 15, 2021, provisional application No. 63/121,938, filed on Dec. 6, 2020.

(51) Int. Cl.
| | |
|---|---|
| *B64F 3/02* | (2006.01) |
| *B64C 39/02* | (2023.01) |
| *B64D 47/02* | (2006.01) |
| *B64U 10/13* | (2023.01) |

(52) U.S. Cl.
CPC .............. *B64F 3/02* (2013.01); *B64C 39/022* (2013.01); *B64D 47/02* (2013.01); *B64C 39/024* (2013.01); *B64U 10/13* (2023.01)

(58) Field of Classification Search
CPC ....... B64F 3/02; B64C 39/022; B64C 39/024; B64C 2201/027; B64C 2201/148; B64D 47/02
See application file for complete search history.

(56) References Cited

U.S. PATENT DOCUMENTS

| | | | |
|---|---|---|---|
| 7,510,142 B2 | 3/2009 | Johnson | B64C 27/08 |
| 8,434,920 B2 | 5/2013 | Jones | F21V 1/20 |
| 8,587,238 B2 | 11/2013 | Maiocchi | H02M 3/335 |
| 8,729,589 B2 | 5/2014 | Hussell et al. | H01L 21/00 |

(Continued)

FOREIGN PATENT DOCUMENTS

| | | | | |
|---|---|---|---|---|
| CN | 103144779 | 6/2013 | | B64F 1/36 |
| CN | 105083548 | 11/2015 | | B64C 27/20 |

(Continued)

OTHER PUBLICATIONS

International Search Report and Written Opinion issued in application No. PCT/US21/61752, dated Feb. 3, 2022, 14 pgs.

(Continued)

*Primary Examiner* — Benjamin P Lee
(74) *Attorney, Agent, or Firm* — HAYES SOLOWAY P.C.

(57) ABSTRACT

An aerial vehicle electrical power system for use with a tethered aerial vehicle, and related methods are provided. The aerial vehicle electric power system includes a plurality of light-emitting diodes (LED) carried by an aerial vehicle. At least one electrical circuit is carried by the aerial vehicle. The at least one electrical circuit has a DC buck converter electrically in series with at least a portion of the plurality of LEDs. A tether is connected between the aerial vehicle and a power source positioned remote from the aerial vehicle. Electrical power is transmitted to the aerial vehicle and at least a portion of the plurality of LEDs through the tether. The electrical circuit minimizes variances in power supplied to the aerial vehicle and the plurality of LEDs.

17 Claims, 6 Drawing Sheets

(56) References Cited

U.S. PATENT DOCUMENTS

| | | | |
|---|---|---|---|
| 8,934,267 B2 | 1/2015 | He et al. | H02M 3/335 |
| 9,446,858 B2 | 9/2016 | Hess | B64F 3/02 |
| 9,611,038 B2 | 4/2017 | Dahlstrom | G01C 23/00 |
| 9,800,091 B2 | 10/2017 | Nugent, Jr. et al. | B64F 3/02 |
| 9,820,343 B1 | 11/2017 | Fragiacomo et al. | H05B 33/08 |
| 9,853,455 B1 | 12/2017 | Casey et al. | H02J 1/10 |
| 9,975,632 B2 | 5/2018 | Alegria | G05D 1/00 |
| 10,011,352 B1 | 7/2018 | Dahlstrom | B64C 39/02 |
| 10,099,782 B2 | 10/2018 | Hundemer | B64C 39/02 |
| 10,669,042 B2 | 6/2020 | Molnar et al. | B64D 47/06 |
| 10,696,395 B2 | 6/2020 | Molnar et al. | B64C 39/02 |
| 10,875,648 B2 | 12/2020 | Schmalzried et al. | B64D 1/22 |
| 10,950,988 B1 | 3/2021 | Thiel et al. | H02M 3/04 |
| 11,136,215 B2 | 10/2021 | Benson | B65H 75/36 |
| 11,142,316 B2 | 10/2021 | Sikora et al. | B64C 39/02 |
| 11,235,890 B1 | 2/2022 | Dahlstrom et al. | B64D 47/08 |
| 2007/0040696 A1 | 2/2007 | Mubaslat et al. | G08B 21/00 |
| 2012/0044710 A1 | 2/2012 | Jones | B64C 39/02 |
| 2013/0233964 A1 | 9/2013 | Woodworth et al. | B64C 37/02 |
| 2014/0183300 A1 | 7/2014 | MacCulloch et al. | B64C 39/02 |
| 2014/0236388 A1 | 8/2014 | Wong et al. | B64C 27/08 |
| 2015/0041598 A1 | 2/2015 | Nugent et al. | B64D 27/02 |
| 2016/0185456 A1 | 6/2016 | Ducharme et al. | B64C 39/02 |
| 2016/0313744 A1 | 10/2016 | Amelio et al. | G05D 1/10 |
| 2016/0318607 A1 | 11/2016 | Desai et al. | B64D 1/16 |
| 2017/0308104 A1 | 10/2017 | Eberheim et al. | G05D 1/10 |
| 2017/0346387 A1 | 11/2017 | Davis et al. | H02M 1/32 |
| 2018/0118374 A1 | 5/2018 | Lombardini et al. | B64F 3/02 |
| 2018/0150073 A1 | 5/2018 | Lee et al. | G05D 1/00 |
| 2018/0205242 A1 | 7/2018 | Kelly-Morgan et al. | H02J 7/00 |
| 2018/0287833 A1 | 10/2018 | Kennedy | H04L 25/26 |
| 2019/0047704 A1 | 2/2019 | Liu | B64C 39/02 |
| 2019/0112048 A1 | 4/2019 | Culver | B64C 39/02 |
| 2019/0283869 A1 | 9/2019 | Broberg et al. | B64C 39/02 |
| 2020/0153340 A1 | 5/2020 | Traube | H02M 3/158 |
| 2020/0211737 A1 | 7/2020 | Parr | H01B 9/00 |
| 2020/0231279 A1 | 7/2020 | Buyse et al. | B64C 39/02 |
| 2020/0310466 A1 | 10/2020 | Fischer | G05D 1/10 |
| 2020/0369408 A1 | 11/2020 | Dolata et al. | B64F 3/02 |
| 2021/0269149 A1 | 9/2021 | Culver | B64C 39/02 |
| 2021/0341128 A1 | 11/2021 | Abron | F21S 43/14 |
| 2021/0362856 A1 | 11/2021 | Hashiguchi et al. | B64C 39/02 |
| 2021/0366282 A1 | 11/2021 | Hashiguchi et al. | G08G 1/127 |
| 2022/0024577 A1 | 1/2022 | Stamatovski | B64C 39/02 |
| 2022/0177159 A1 | 6/2022 | Bostick | B64F 3/02 |
| 2022/0255316 A1 | 8/2022 | Perkinson et al. | H02J 1/12 |

FOREIGN PATENT DOCUMENTS

| | | | |
|---|---|---|---|
| CN | 104081112 | 3/2016 | F21S 2/00 |
| CN | 206432912 | 8/2017 | H02M 7/217 |
| CN | 105217044 | 3/2019 | B64D 27/24 |
| DE | 102017216681 | 3/2019 | B64C 39/02 |
| KR | 10-2016-0085719 | 7/2016 | F21V 7/10 |
| KR | 102472923 | 11/2022 | B60L 58/30 |
| WO | WO2007022409 | 2/2007 | G01R 31/2635 |
| WO | WO2019175134 | 9/2019 | H02M 3/156 |

OTHER PUBLICATIONS

U.S. Appl. No. 17/541,649, filed Dec. 3, 2021.

Notice of Allowance issued in Chinese Application No. 202180082251.7, with machine translation, dated Jan. 2, 2024, 12 pgs.

Notice of Allowance issued in Korean Application No. 10-2023-7019356, with machine translation, dated Jan. 24, 2024, 7 pgs.

Search Report issued in EP Application No. 21 901 506.2, dated Feb. 7, 2024, 7 pgs.

International Search Report and Written Opinion issued in WO Patent Appln. No. PCT/US2024/010552, dated Mar. 25, 2024, 12 pgs.

SYSTEM AND METHOD FOR PROVIDING ELECTRICAL POWER TO A TETHERED AERIAL VEHICLE

CROSS REFERENCE TO RELATED APPLICATIONS

This application is a continuation application of U.S. patent application Ser. No. 17/541,649 entitled, "System and Method for Providing Electrical Power to a Tethered Aerial Vehicle" filed Dec. 3, 2021, which claims benefit of U.S. Provisional Application Ser. No. 63/121,938 entitled, "System to power both a UAS and Lighting from a single two-wire power source" filed Dec. 6, 2020, and U.S. Provisional Application Ser. No. 63/149,660 entitled, "Methods to power both a UAS and high power lighting from a tether" filed Feb. 15, 2021, the entire disclosures of which are incorporated herein by reference.

FIELD OF THE DISCLOSURE

The present disclosure is generally related to electrical power systems and more particularly is related to a system and method for providing electrical power to a tethered aerial vehicle.

BACKGROUND OF THE DISCLOSURE

Aerial systems, and in particular, unmanned aerial systems (UASs) are becoming increasingly prevalent. In the military, both manned aerial systems and UASs are commonly used to conduct surveillance, deliver items, and perform operations. Outside of the military, UASs or drones are widely used in recreation, sport, and various industries to perform tasks. In recent times, UASs have been outfitted with electronic devices, such as cameras, thereby allowing users to take aerial photographs.

In a similar manner, UASs have been equipped with lights in order to provide aerial or elevated overhead lighting of an outdoor space. These UASs with lights can be used to provide fast and temporary lighting for an outside space, in place of more traditional outdoor lighting units, such as permanent light poles or trailer-mounted lighting units which have temporary lights that are raised to an elevated position. High power wide area lighting from these UASs, typically greater than 20,000 lumens delivered from higher than 25 feet, enables many activities to occur outdoors at night which would not otherwise be possible, including, for example, construction, sports, and entertainment. Additionally, with the advancement of both UAS and lighting technology, it is now possible for a UAS to lift high-powered lighting devices to altitudes at and above that of conventional light poles. Currently, due to the power limitations of the onboard battery of the UAS, most implementations of high power lighting on UASs emit less than 12,000 lumens and are limited to less than an hour of lighted flight.

To provide temporary outdoor lighting for longer periods of time, or to provide brighter lighting, a UAS may be equipped with a tether which electrically connects the UAS with a ground-based power supply, such as a battery, generator, or a traditional hardwired power from the grid. Using a tethered UAS, it is now possible to provide continuous power to the UAS. The tether typically includes a wire having conductors which may be enveloped within a sheathing or light-weight rope. Electrical power may be delivered from the ground-based power supply, through the tether, and to both the UAS's propulsion or flight control systems and the lighting system carried by the UAS. However, it can often be difficult to deliver the electrical power to both the UAS and high powered LEDs through the tether in a weight efficient manner. Lowering the payload weight would enable smaller, lighter, more portable, and less power hungry UASs to be used for lighting.

Current tethered UASs are designed to power a number of different payloads. Typically, higher voltage DC delivered through the tether from the ground-based power source is down converted by an onboard DC converter to a lower voltage for use by the drone and accessories including high power lighting. If more power for the light accessory is required, then a larger, and heavier, DC converter and heat sink will also be required. Thus, to carry the extra weight, the UAS size must increase as the power requirement for lighting increases. As the overall weight increases, the required power from the ground-based power system also increases.

Thus, a heretofore unaddressed need exists in the industry to address the aforementioned deficiencies and inadequacies.

SUMMARY OF THE DISCLOSURE

Embodiments of the present disclosure provide an aerial vehicle electrical power system. Briefly described, in architecture, one embodiment of the system, among others, can be implemented as follows. A plurality of light-emitting diodes (LEDs) is carried by an aerial vehicle. At least one electrical circuit is carried by the aerial vehicle, wherein the at least one electrical circuit has a DC buck converter electrically in series with at least a portion of the plurality of LEDs. At least one amperage boost regulator is in parallel with the DC buck converter. A tether is connected between the aerial vehicle and a power source positioned remote from the aerial vehicle, wherein electrical power is transmitted to the aerial vehicle and at least a portion of the plurality of LEDs through the tether, wherein when the DC buck converter draws greater amperage, the amperage boost regulator draws less amperage thereby decreasing amperage variances across the tether, and wherein when the DC buck converter draws less amperage, the amperage boost regulator draws greater amperage thereby decreasing amperage variances across the tether.

The present disclosure can also be viewed as providing an aerial vehicle electrical power system. Briefly described, in architecture, one embodiment of the system, among others, can be implemented as follows. The aerial vehicle electrical power system has an aerial vehicle and a plurality of light-emitting diodes (LEDs) carried by the aerial vehicle. At least one electrical circuit is carried by the aerial vehicle, wherein the at least one electrical circuit has a DC buck converter electrically in parallel with an amperage boost regulator, wherein the amperage boost regulator regulates voltage variances across the parallel circuit formed between the amperage boost regulator and the DC buck converter. A tether is connected between the aerial vehicle and a power source positioned remote from the aerial vehicle, wherein electrical power is transmitted to the aerial vehicle and at least a portion of the plurality of LEDs through the tether.

The present disclosure can also be viewed as providing methods for powering an aerial vehicle carrying lights. In this regard, one embodiment of such a method, among others, can be broadly summarized by the following steps: providing an aerial vehicle having a plurality of light-emitting diodes (LEDs) mounted thereto; connecting a tether between the aerial vehicle and a power source located remote from the aerial vehicle surface; providing at least one electrical circuit carried by the aerial vehicle, wherein the at least one electrical circuit has a DC buck converter electrically in series with at least a portion of the plurality of LEDs; electrically connecting at least one resistance device in parallel to the DC buck converter; and transmitting a quantity of electrical power through the tether, wherein the quantity of electrical power is transmitted through the at least one electrical circuit carried by the aerial vehicle, wherein the at least one resistance device regulates amperage variances across the at least one electrical circuit.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

To improve over the shortcomings described in the Background, the subject disclosure is directed to an aerial vehicle electrical power system, and related methods, apparatuses, and technologies. As described herein, the aerial vehicle electrical power system may be used to improve the electrical performance of a tethered vehicle, such as a UAS, a manned aerial system, a drone, or any other type of vehicle which operates with a tether. In particular, the aerial vehicle electrical power system may allow for proper power distribution and control of electrical power supplied through the tether to both the tethered vehicle itself, e.g., the propulsion or control systems of the vehicle, and to lights, cameras, or other devices which are carried by the aerial vehicle. For clarity in disclosure, lights, and specifically light-emitting diodes (LEDs), are the exemplary electronic device carried by the aerial vehicle described herein, but any other type of electronic device carriable by the aerial vehicle is considered within the scope of this disclosure. The use of the aerial vehicle electrical power system helps minimize, prevent, and smooth electrical voltage variances within the aerial vehicle or the LEDs, irrespective of varying power draw of the DC buck converter as it powers the UAS and/or other accessories.

Figure 1:
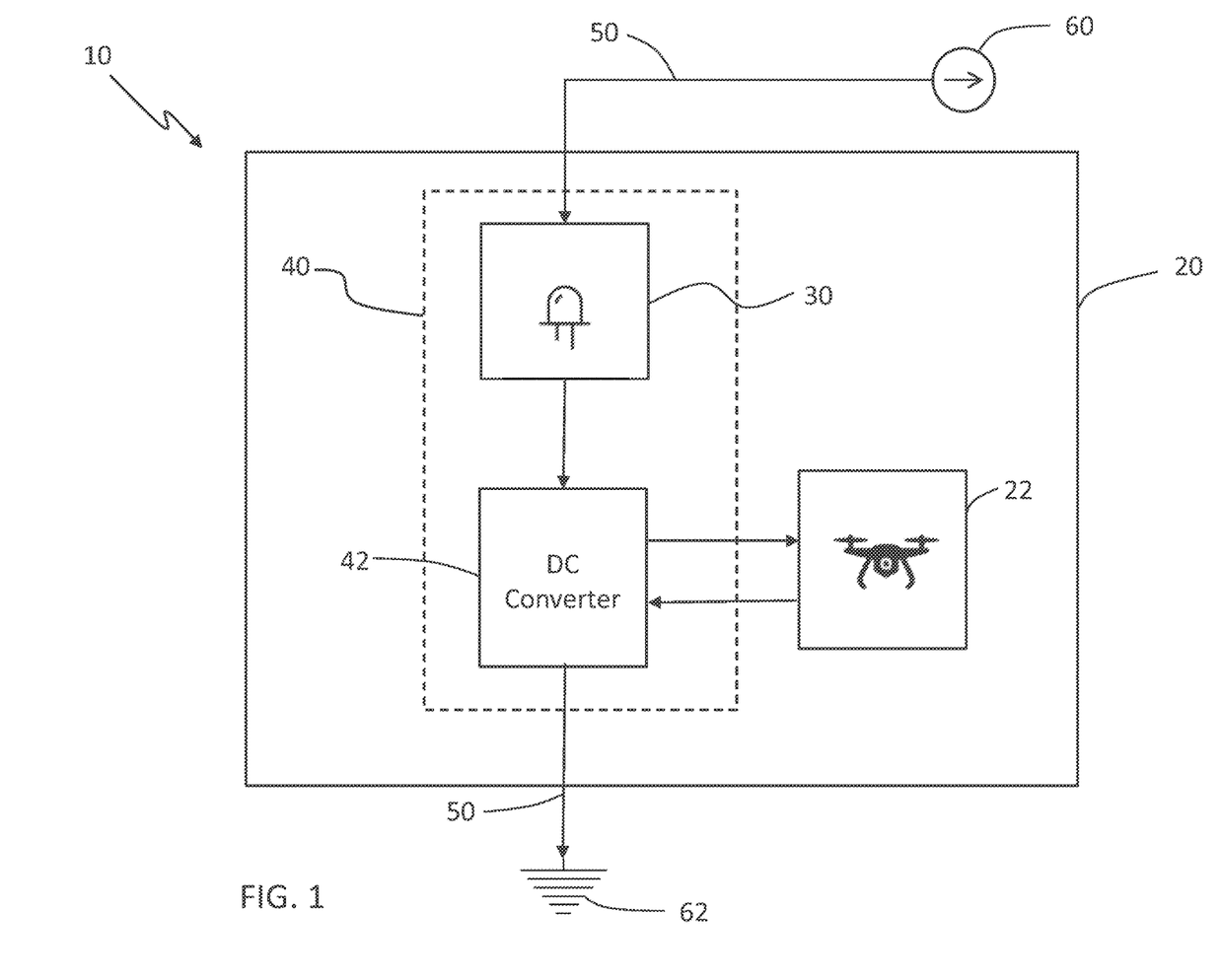
FIG. 1 is a schematic diagram of an aerial vehicle electrical power system, in accordance with a first exemplary embodiment of the present disclosure.
Figure 2:
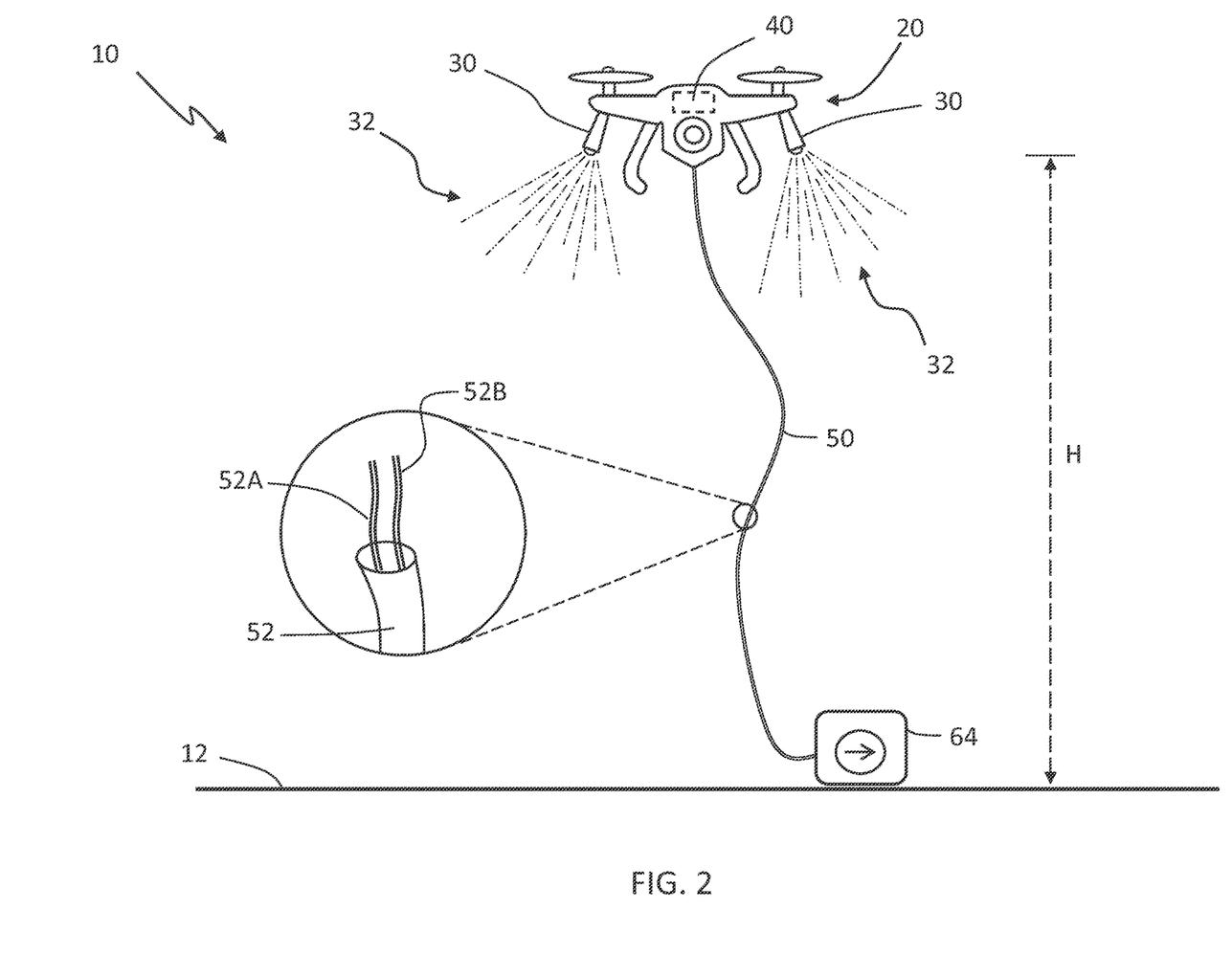
FIG. 2 is a diagrammatical illustration of a tethered aerial vehicle using the aerial vehicle electrical power system of FIG. 1, in accordance with the first exemplary embodiment of the present disclosure.

FIG. 1 is a schematic diagram of an aerial vehicle electrical power system 10, in accordance with a first exemplary embodiment of the present disclosure. FIG. 2 is a diagrammatical illustration of a tethered aerial vehicle using the aerial vehicle electrical power system of FIG. 1, in accordance with the first exemplary embodiment of the present disclosure. With reference to FIGS. 1-2, the aerial vehicle electrical power system 10, which may be referred to herein simply as 'system 10' includes an serial vehicle 20, which may include any type of aerial vehicle, such as manned vehicle, an unmanned aerial system (UAS), a drone, or a similar vehicle. A plurality of light-emitting diodes (LEDs) 30 are carried by the aerial vehicle 20, such as by mounting one or more LED arrays or similar lighting fixtures to the frame of the aerial vehicle 20. The LEDs 30 are capable of illuminating a quantity of light 32 upon a surface of the ground 12, or another location. In one example, the LEDs are high-powered LEDs capable of emitting substantially 20,000 lumens or greater.

At least one electrical circuit 40 is carried by the aerial vehicle 20, and often, the electrical circuit 40 may be integrated with the electrical system of the aerial vehicle 20 itself, such that it is in communication with the propulsion and control system 22 of the aerial vehicle 20. As shown in FIG. 1, the electrical circuit 40 has a DC buck converter 42 which is connected electrically in series with at least a portion of the plurality of LEDs 30. It is noted that the LEDs 30 may be in series before or after the DC buck converter 42. The DC buck converter 42 has the characteristic that it outputs lower voltage relative to the input voltage, and outputs higher amperage relative to the input amperage. The DC buck converter may include one or more converters depending on the design of the system 10. For example, a single DC buck converter 42 or multiple DC buck converters (not shown) may be used in parallel and/or in series. In one situation, if the amperage boost converter (discussed relative to FIG. 3) contains LEDs in series, then the DC buck converter 42 inputs may be configured in series by using the LEDs of amperage boost converter in series as voltage dividers.

A tether 50 is connected between the aerial vehicle 20 and a positive terminal 60 and the negative terminal 62 of a power source 64 positioned on the ground surface 12 or similar location remote from the aerial vehicle. Within the scope of this disclosure, the power source 64 may be located on the Earth's surface, on a land or water based vehicle, on a different UAS, or in any other location which is remote from the aerial vehicle 20. Electrical power for powering the LEDs 30 and the aerial vehicle 20 is transmitted to the aerial vehicle 20 and at least a portion of the plurality of LEDs 30 through the tether 50. Power is supplied to the aerial vehicle 20 and the LEDs 30 using the tether 50 which is formed from a two-conductor wire 52, having a positive conductor 52A and a negative (or ground) conductor 52B, which are connected to the positive terminal of the power source 64 and the negative terminal 62 of the power source 64. While the power source 64 may vary, in one example, it is a DC power source and a boost converter which maintains a constant voltage. Although a four or three-conductor wire used in the tether 50 could feasibly be a power solution for the aerial vehicle 20 and LEDs 30, and may be simpler to implement, the added weight from the additional wires, as compared to a two-conductor wire tether 50, would require more power to the aerial vehicle 20, and likely an aerial vehicle 20 with a greater lift capacity. The use of a two-conductor wire enables the minimum possible tether weight to be achieved, which in turn, lowers the overall weight of the aerial vehicle 20, thereby reducing the power required by the aerial vehicle 20. In some instances, this means that potentially, a smaller and less expensive aerial vehicle 20 may be used. Thus, the use of the two-conductor wire as the tether 50, or as a component of the tether 50, ensures the tether 50 is light enough to not add unneeded weight to the payload of the aerial vehicle 20.

While there are many benefits of the system 10, one benefit is the ability to operate an aerial vehicle-mounted light system for extended or indefinite periods of time and with lighting capacity which meets or exceeds the required uses. Additionally, the system 10 minimizes the probability that the operation of the aerial vehicle 20 and the LEDs 30 is interrupted by power variances through the tether 50 and to the aerial vehicle 20. For instance, during certain aspects of flight of the aerial vehicle 20, such as upon initial start-up and takeoff, the aerial vehicle 20 can draw substantially mom power than during constant flight. Similarly, certain maneuvers of the aerial vehicle 20 will cause it to draw more power than when it is stationary. Since the LEDs 30 and the aerial vehicle 20 are powered by the same power source 64 through the tether 50, these power draws from the aerial vehicle 20 can result in flickering or similar undesirable issues with the LEDs 30. The system 10 can regulate these power variances through the tether 50 and from the aerial vehicle 20 to minimize the variance of light output from the LEDs 30.

Figure 3:
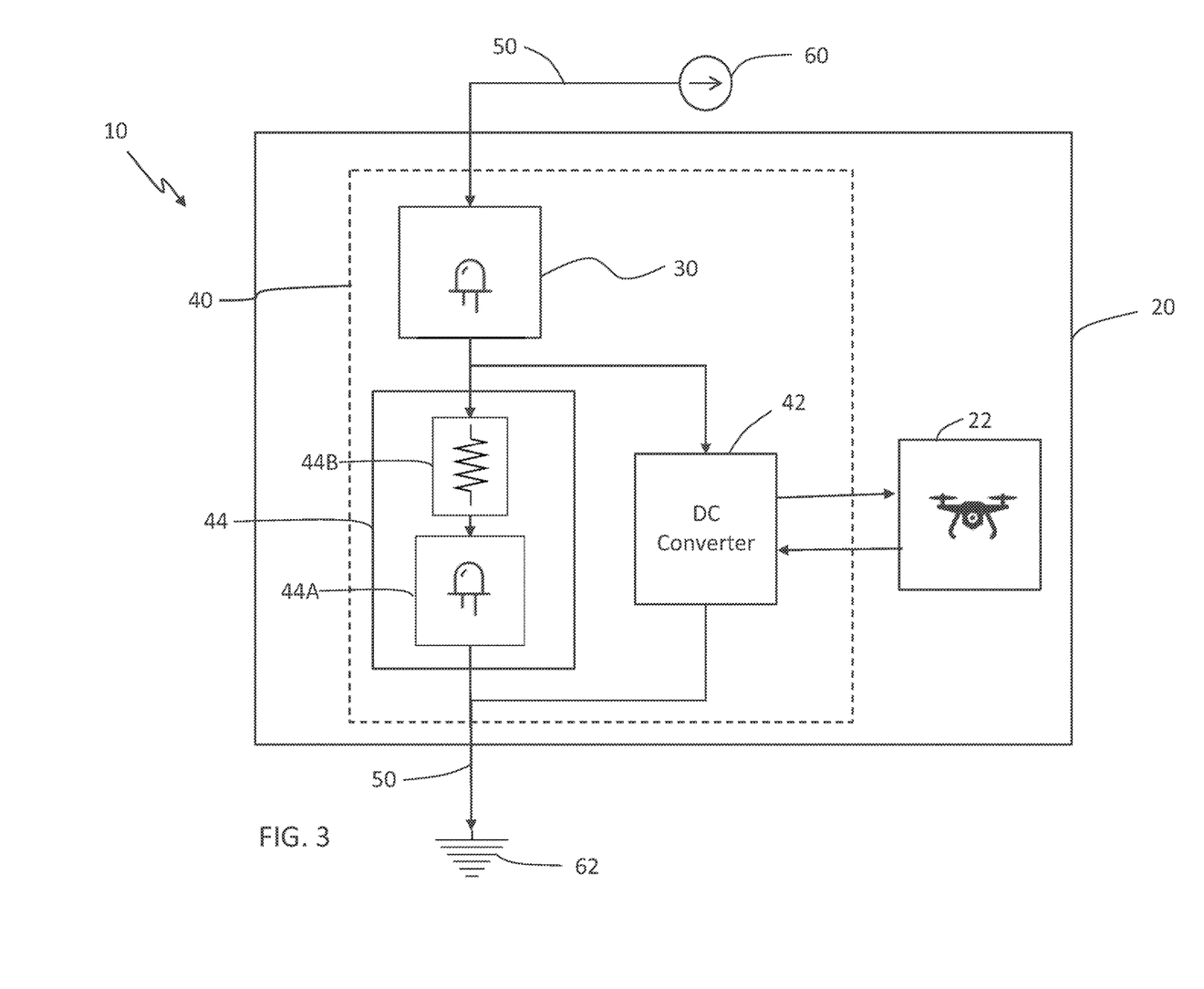
FIG. 3 is a schematic diagram showing a variation of the aerial vehicle electrical power system of FIG. 1, in accordance with the first exemplary embodiment of the present disclosure.

Further details of the system 10 can be seen in FIG. 3, which is a schematic diagram showing a variation of the aerial vehicle electrical power system 10 of FIG. 1, in accordance with the first exemplary embodiment of the present disclosure. In particular, FIG. 3 illustrates an example of the system 10 which uses an amperage boost regulator 44, which is a resistance device, such as a diode, which increases in resistance as voltage across amperage boost regulator 44 decreases. The amperage boost regulator 44 may be used in parallel with a load which has a high variance of amperage requirements, such as the DC buck converter 42 as it powers the aerial vehicle 20. The amperage boost regulator 44 acts by decreasing amperage and voltage variances across the parallel circuit formed between the amperage boost regulator 44 and the DC buck converter 42, which may be caused by amperage variances from the DC buck converter 42 and resistance between the electrical power source 64 and the parallel circuit. As is known, a DC buck converter 42 may have an input voltage range, e.g., maximum input voltage and minimum input voltage, with which it must be operated. During operation, when the voltage across the DC buck converter 42 approaches the maximum input voltage of the DC buck converter 42, the parallel amperage boost regulator 44 pulls greater amperage which, due planned resistance in the system 10 including the tether 50, limits voltage increases and allows the DC buck converter's 42 input voltage to remain below the input maximum.

The point at which the parallel amperage boost regulator 44 pulls greater amperage can vary depending on the design of the system 10. For instance, in one example, if the maximum input voltage for the DC buck converter 42 is 45 volts, then the amperage boost regulator 44 could initiate pulling greater amperage at a level within 20% of the maximum 45 v. For example, an amperage boost converter 44, may draw 0 amps below 36 volts, 1 amp at 38 volts, 2 amps at 40 volts, and 5 amps at 44 volts, which may be a typical behavior of the amperage boost converter 44 when configured with LEDs or other resistance device. It is noted that the parallel amperage boost regulator 44 may start to draw greater amperage at any other level or levels beyond those identified in this example, all of which are considered within the scope of the present disclosure.

As shown in FIG. 3, the amperage boost regulator 44 includes at least one or more LEDs 44A or a resistance device 44B, but may, in some situations, include both. In this example, the LEDs 44A may be characterized as primary LEDs while the LEDs 30 are secondary or optional LEDs which can provide additional lighting. The LEDs 44A and the resistance device 44B are in parallel with the DC buck converter 42. It is noted that the DC buck converter 42 may include various types of step-down converters or similar devices, such as, for instance, a buck converter which is a DC-to-DC power converter which outputs lower voltage relative to the input voltage, and output higher amperage relative to the input amperage.

In the configuration shown in FIG. 3, the voltage across the power source 64 is above the maximum voltage allowed by the DC buck converter 42. To lower the voltage at the DC buck converter 42 to be below the maximum voltage allowed by the DC buck converter 42, the resistance of the amperage boost regulator 44 is configured to draw sufficient amperage such that the resistance within the tether wire 50 and the LEDs 30 in series with the DC buck converter 42 reduces the voltage to the DC buck converter 42 to be below the maximum voltage allowed.

For a configuration where the aerial vehicle 20 has a power station or base station with a power source 64 which is continuously providing constant voltage to the end of the tether 50 connected to the power source 64, the amperage boost regulator 44 minimizes light flicker within the LEDs 30, which would otherwise be caused by power variances from operation of the aerial vehicle 20, as previously described. Accordingly, the system 10 allows for an electrically unlimited number of LEDs 30 to be added and powered in series by simply increasing the voltage through the tether 50 and without requiring more powerful and heavier DC back converters.

An additional benefit of using the amperage boost regulator 44 is that it allows for lower voltage to be used in a similar diameter conductor within the tether 50. Varying amperage causes voltages across a wire to vary. The amperage boost regulator 44, which minimizes the amperage variation, also minimizes voltage variation. As a result, a smaller diameter—and lower weight—conductor may be used, versus a configuration where amperage variations are not minimized. Alternatively, a longer tether 50 may be used without increasing the conductor wire diameter. If using a smaller diameter conductor wire, energy savings and performance benefits of a lowered total wire weight can be balanced against any lost electrical efficiencies due to increased wire resistance, as may be determined by the individual design of the system 10.

Relative to FIGS. 2-3, in one example of use of the system, the power source 64 is integrated into a ground base power station located on the ground surface 12. The power source 64 supplies constant voltage through a conductor in the tether 50 to the electrical circuit 40, which is attached to or integrated within the aerial vehicle 20. A DC buck converter 42 typically operates only within a specified narrow range of voltages, for instance, between 30 to 45 volts. The resistance range of the amperage boost regulator 44 is configured such that it draws sufficient amperage across the LEDs 30, connected in series, and the tether 50 with conductors to reduce the voltage at the DC buck converter 42 to be within the DC buck converter's 42 required input voltage range. As the aerial vehicle 20 requires more power, the DC buck converter 42 draws more amperage and then the input voltage to the DC buck converter 42 decreases, due to wire resistance. As this happens, the amperage boost regulator 44 receives lower voltage, increases resistance, and decreases its load (amperage used). With decreasing voltage, the DC buck converter 42 effectively maintains power priority over the amperage boost regulator 44, thereby ensuring the propulsion and control system 22 of the aerial vehicle 20 are not unduly limited.

While the amperage boost regulator 44 may include an additional LED 44A and/or a resistance device 44B, one advantage of using LEDs 44A within the amperage boost regulator 44 is that, due to the LED forward voltage characteristics, it will more quickly yield power to the DC buck converter 42 as voltages decline as compared to a standard resistance device 44B. For example, a resistor's resistance (in ohms) does not change across voltage ranges such as substantially 0 v to 40 v. In contrast, a LEDs 44A resistance may be very high from substantially 0 v to 30 v and rapidly decrease from 30 v to 40 v. The higher power priority of the DC buck converter 42 is important to better ensure sustained power to the propulsion and control system 22 of the aerial vehicle 20.

It may be necessary to perform calculations to balance the voltages within the system 10 to maintain the correct voltage to the DC buck converter 42. Specifically, in one example of a voltage balancing and parallel load determination process, the base station power supply provided to the tether 50 is calculated to maintain balance such that voltage to the DC buck converter 42 is maintained within the required range. This can be summarized with the following equation:

$$V_{Base\ Power\ Supply} = V\ Drop_{Tether} + V\ Drop_{Optional\ series\ LED} + V_{Required\ for\ DC\ converter}$$

where $V_{Base\ Power\ Supply}$ is the based voltage from the power supply, $V\ Drop_{Tether}$ is the voltage drop across the tether 50, $V\ Drop_{Optional\ series\ LED}$ is the voltage drop across the LEDs 30 positioned in series with the DC buck converter 42, and $V_{Required\ for\ DC\ converter}$ is the voltage required for the DC buck converter 42.

Voltage ranges based on expected amperage variances may also be considered in the calculations. This example of the system 10 assumes that the voltage from the base station power supply will be set according to this calculation and that the supplied source voltage across the power source 64 terminals 60, 62, to which the tether 50 is connected, will be constant. For example, the following aspects of the system 10 may be considered for balancing the system 10:

1. Determine the minimum and maximum voltages and amperages for:
   a. The DC buck converter 42;
   b. The optional LEDs 30 forward voltage range and maximum current (if present);
   c. The primary LEDs 44a forward voltage range and maximum current (if present);
   d. The amperage boost regulator 44;
   where the maximum voltage required from the power supply at the ground station is calculated when the DC buck converter 42 and the amperage boost regulator 44 are pulling maximum expected amperes.
2. If using the optional LEDs 30 in series, calculate or test to determine the resistance required by the amperage boost regulator 44 to enable the optional LEDs 30 in series to activate and provide the sufficient voltage and amperage to the DC buck converter 42.
3. Recalculate to ensure the maximum amperage pulled by both the parallel load of the amperage boost regulator 44 and the DC buck converter 42 will not exceed the maximum amperage rating of the LED.
4. Test to ensure that power is maintained to the serial vehicle 20 from power off (0 power) to full power and that the LEDs 30 and 44a illuminate as expected.

It is noted that the system 10 described relative to FIG. 3, may include variations in the electrical circuit 40. For example, the LEDs 30 in series may not be present, but the amperage boost regulator 44 may contain one or more LEDs 44A. This variation may be used when additional light is not required. Similarly, in another example, the LEDs 30 in series may not be present, and the voltage across the power source 64 is below the maximum input voltage required by the DC buck converter 42. The amperage boost regulator 44 may contain one or more LED 44A. The advantage of this simplified configuration is that it enables switched LED dimming to be used, such as by quickly turning the LEDs 44A in the amperage boost regulator 44 on and off. In this configuration, the amperage boost regulator 44 would not be used to lower voltage to the DC buck converter 42. Additionally, it is optionally possible to use a dimmer with the amperage boost regulator 44 to cause the amperage boost regulator 44 resistance to increase, such as by using a variable resistor or pulse width modulation (PWM). With greater resistance, less amperage will flow through the LEDs 44A.

To provide additional clarity in disclosure, a working example of the system 10 uses the amperage boost regulator 44 configuration of FIG. 3 with the diagrammatical illustration of FIG. 2. With reference to FIGS. 2-3, a prototype system 10 included an aerial vehicle 20 flying at height (H) of 40 feet above the ground surface 12. The prototype of the system 10 uses 4 LEDs, where two LEDs are in a parallel load configuration, e.g., 44A, and two additional LEDs 30 are in series with the other two LEDs 44A. The LEDs 30, 44A draw approximately 200 watts and provide over 20,000 lumens of light. The power supply of the ground power base system provides 100 volts through a 20 gauge wire to the LEDs 30 in series with the amperage boost regulator 44 and the DC buck converter 42. The amperage pulled by the amperage boost regulator 44 reduced the voltage to the DC buck converter 42 such that it is maintained within the DC buck converter's acceptable input voltage range. When the system 10 is initially turned on, the LED lights also turn on, even though the drone is off, due to amperes being pulled by the amperage boost regulator 44 through the LEDs 30 in series. The DC buck converter 42, then receives the voltage with the required input range, powers on, and then provides power to the aerial vehicle 20, namely, the propulsion and control system 22 of the aerial vehicle 20.

In flight, the aerial vehicle 20 and DC buck converter 42 pull slightly more amperage through the LEDs 30 in series, and as a result, the LEDs 30 brighten. The LEDs 44A in the amperage boost regulator 44, dim slightly as amperage decreases due to the voltage decrease and resistance increase. In this example, the amperage boost regulator 44 uses a resistor 44B in series with two LEDs 44A (in parallel). As is a common use, resistors 44B may help to ensure that the maximum amperage of the LEDs is not exceeded.

As can be understood, the system 10 may provide substantial benefits to the field of power systems for UASs, and in particular, those UASs which utilize lights or other electronic equipment onboard. The system 10 allows the UAS to be more weight efficient than other methods of powering onboard electronics, which power the electronics and the UAS itself in a manner which is not in series. Conventional methods require a heavier converter, a heavier tether, or often both. Additionally, the system eliminates the need for a DC buck converter to power the LEDs and it eliminates the need for additional wires in the tether to power the LEDs separately. The result is an increase in light output as the UAS ascends higher (as the UAS ascends, it lifts more tether thereby pulling more amps). It also allows for more and/or higher power LEDs to be added or subtracted with only needing a change in voltage from the base. Conventional systems may need a different DC buck converter, tether, or both. As discussed, the system 10 also minimizes LED flicker from UAS power variances.

Figure 4:
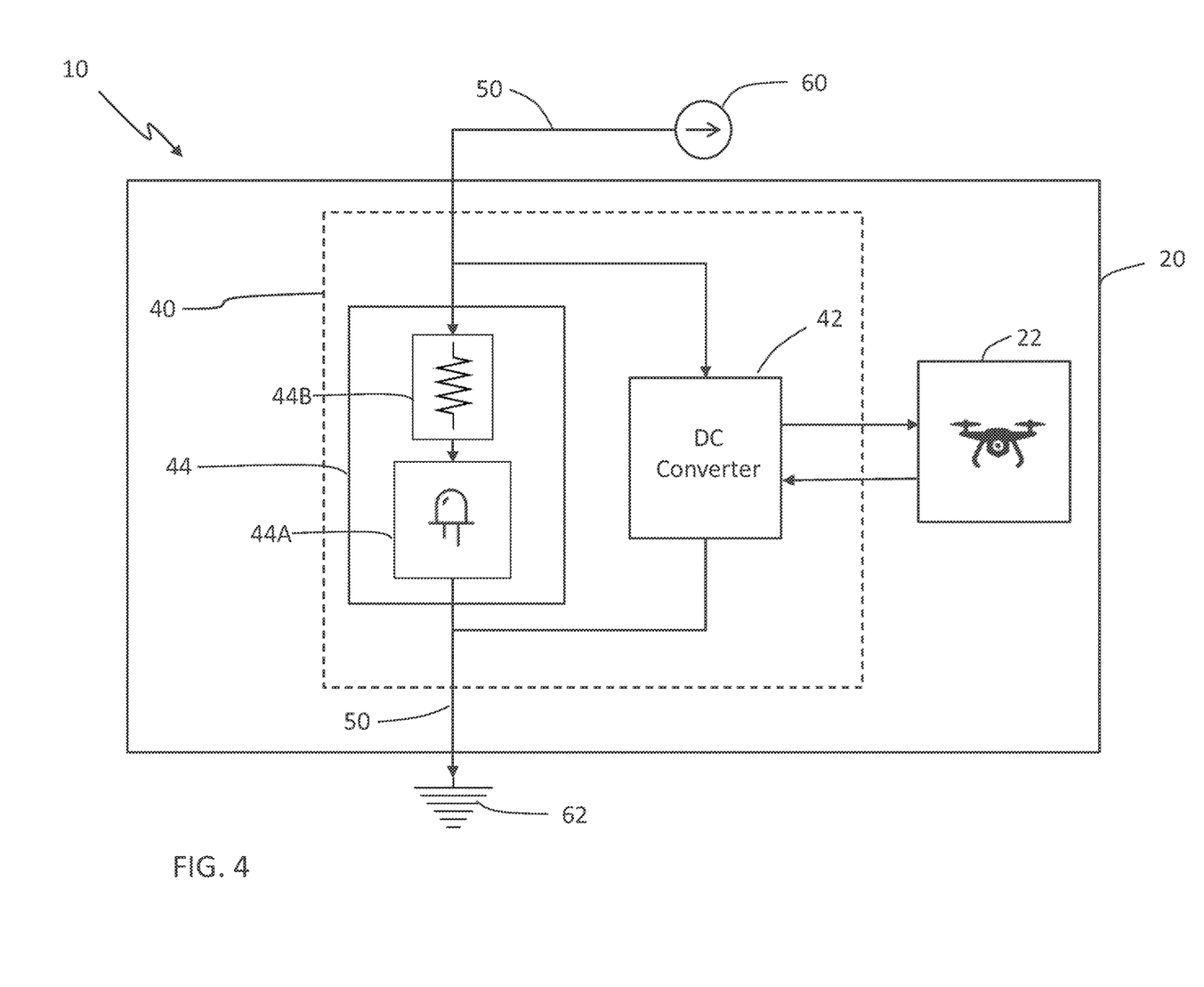
FIG. 4 is a schematic diagram showing a variation of the aerial vehicle electrical power system of FIG. 1, in accordance with a second exemplary embodiment of the present disclosure.
Figure 5:
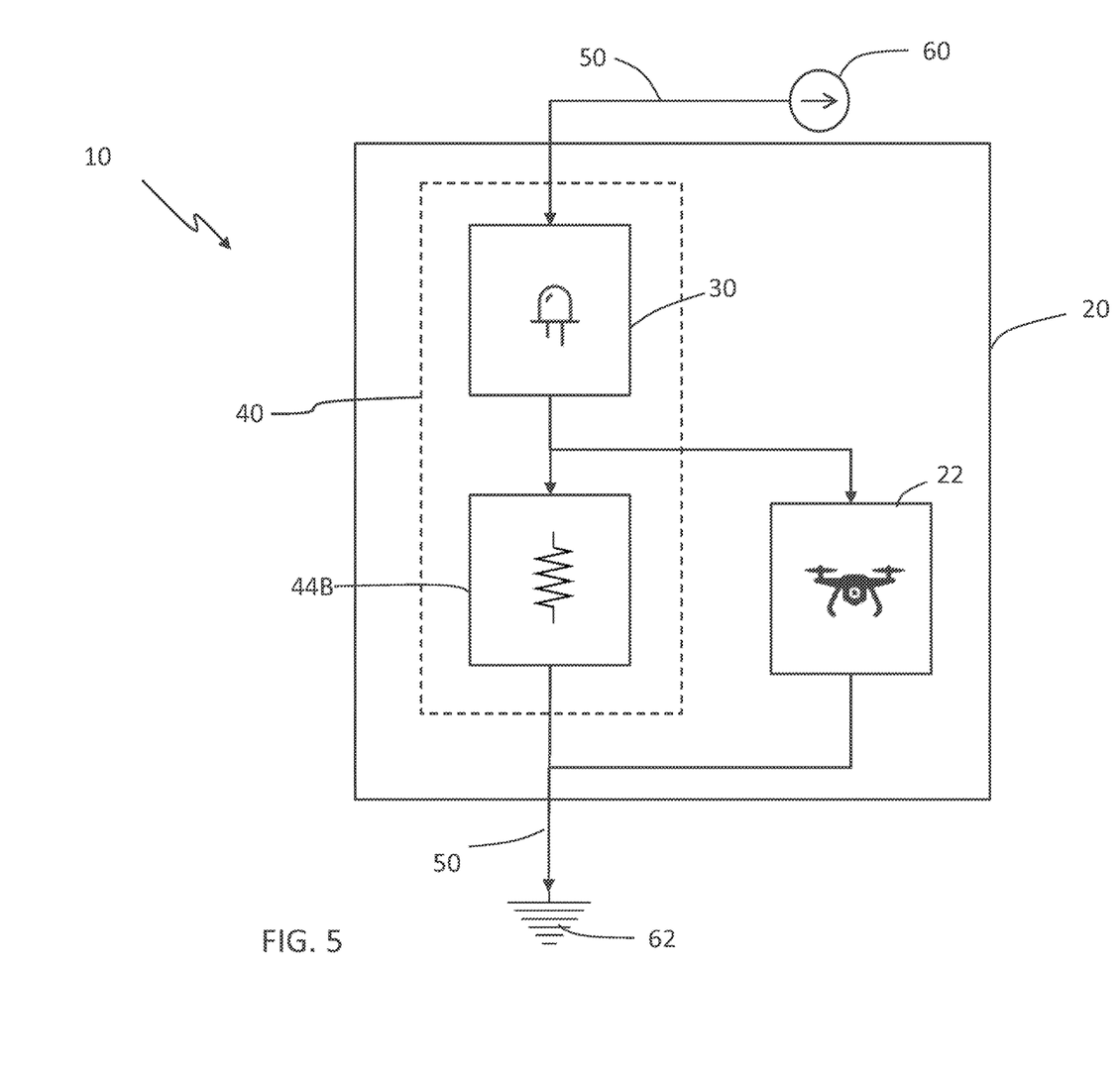
FIG. 5 is a schematic diagram showing a variation of the aerial vehicle electrical power system of FIG. 1, in accordance with a fourth exemplary embodiment of the present disclosure.
Figure 6:
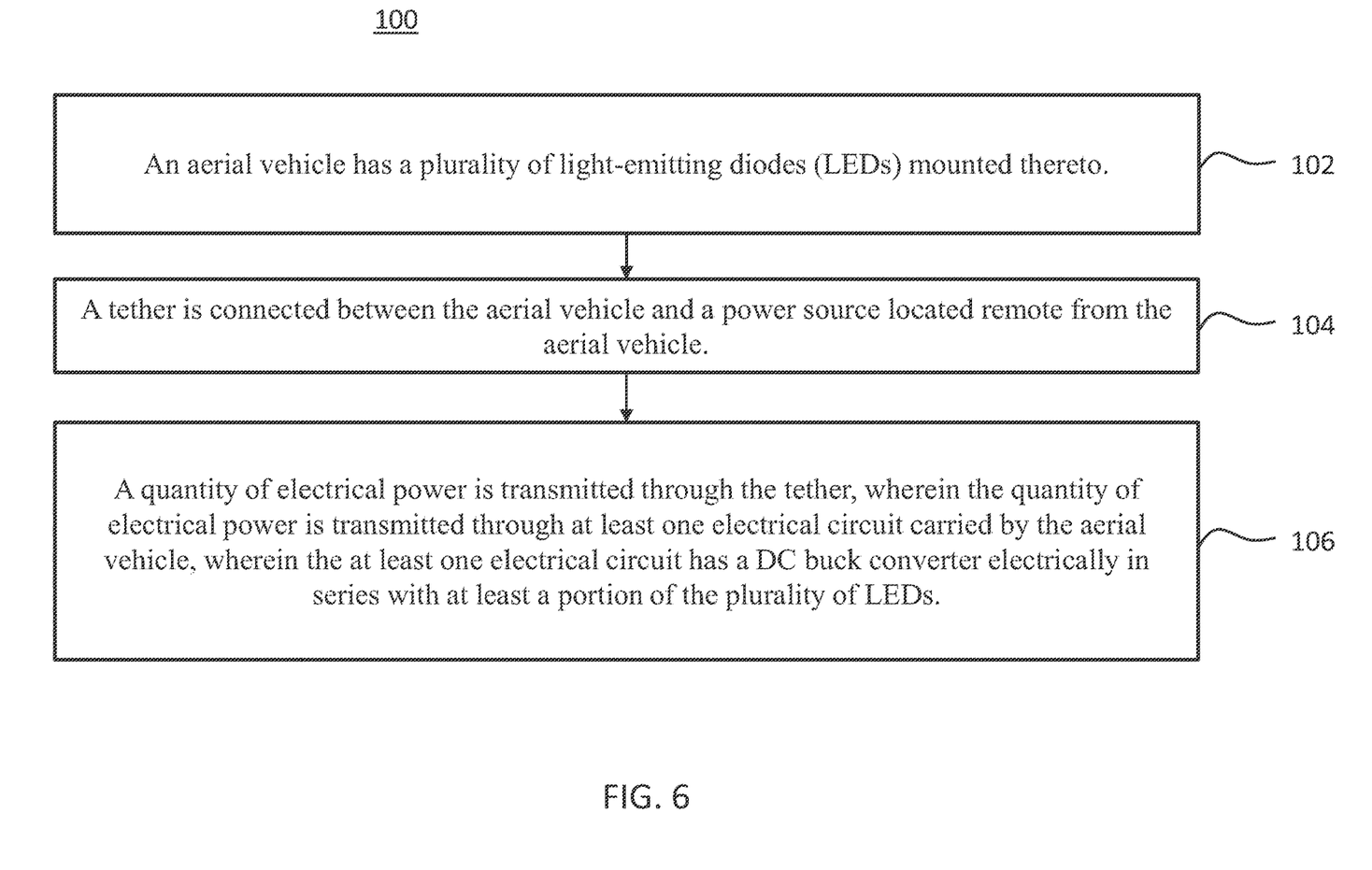
FIG. 6 is a flowchart illustrating a method for powering an aerial vehicle carrying lights, in accordance with the first exemplary embodiment of the present disclosure.

While FIGS. 1-3 describe the system 10 in accordance with the first exemplary embodiment, FIGS. 4-6 describe variations of the system 10 in accordance with other embodiments. Any of the features, components, or functions of the system 10 described relative to FIGS. 1-3 may be used with any embodiment of this disclosure, but the same is not reproduced relative to FIGS. 4-6 for clarity in disclosure.

FIG. 4 is a schematic diagram showing a variation of the aerial vehicle electrical power system 10 of FIG. 1, in accordance with a second exemplary embodiment of the present disclosure. In particular, FIG. 4 illustrates a physical configuration which is shared by the amperage boost regulator 44 and a simple parallel configuration. For both, the power source 64 is located on the ground surface. Electricity travels from the power source 64 through the tethered wire 50 to power the parallel load of the amperage boost regulator 44 and the DC buck converter 42. The DC buck converter 42 lowers the voltage to what is typically required by an aerial vehicle. In terms of flight performance, a very important advantage of paralleling the DC buck converter 42 with the LEDs 44A is that the DC buck converter 42 takes power priority if insufficient amperage is available to fully power both.

In the amperage boost regulator 44 configuration, the voltage across the power source 64 is above the maximum voltage allowed across the inputs of the DC buck converter 42. To lower the voltage to be within the DC buck converter's 42 acceptable range, the amperage load created by the parallel load of the amperage boost regulator 44 is configured to be high enough such that the resistance within the tether 50 lowers the voltage to the DC buck converter 42 to be below the maximum voltage of the DC buck converter 42. The amperage boost regulator 44 may include a resistor 44B, an LED 44A, or both. An advantage of the amperage boost regulator 44 configuration is that it enables both the use of a reduced-weight tether 50 and it enables more efficient DC conversion at the DC buck converter 42 by reducing the voltage variance to the DC buck converter 42.

In the parallel configuration, the voltage provided by the power source 64 is below the maximum voltage allowed by the DC buck converter 42. In this configuration, the load at the amperage boost regulator 44 contains at least one LED 44A. The parallel load power state, e.g., on or off, does not impact the DC buck converter 42. In this configuration, it is assumed that the gauge of the tether wire 50 is configured to be low enough such that voltage to the DC buck converter 42 will be above the minimum when both the parallel load of the amperage boost regulator 44 and the aerial vehicle 20 are at full power.

FIG. 5 is a schematic diagram showing a variation of the aerial vehicle electrical power system 10 of FIG. 1, in accordance with a fourth exemplary embodiment of the present disclosure. Specifically, FIG. 5 is directed to a simplified system 10 where the amperage boost regulator (44 in FIG. 3) is replaced with a resistance device 44B. In this example, the resistance device 44B may have the purpose of drawing sufficient amperage and voltage to activate the primary LEDs 30 and to allow the required voltage to pass to the propulsion and control system 22 of the aerial vehicle 20 even if the propulsion and control system 22 does not draw amperage. LEDs 30 may turn off when sufficient forward voltage is not provided. A resistor 44B, or similar load, between the LEDs 30 and the negative terminal 62, which is shared by the aerial vehicle 20 and the LEDs 30, enables the LEDs 30 to pass sufficient voltage and amperage to enable the propulsion and control system 22 to operate.

The resistance device 44B may also regulate amperage across the tether 50. For instance, the load, which is placed in parallel with the propulsion and control system 22, allows the LEDs 30 to draw a minimum amount of amperes through the tether 50 when the aerial vehicle 20 is off or at low power. As the aerial vehicle 20 pulls an increasing amount of amperes, both the tether 50 and the LEDs 30 use more voltage (due to resistance) and decrease the voltage to the parallel propulsion and control system 22 with the resistance device 44B. As voltage to the resistance device 44B decreases, the amperage required by it also decreases. The propulsion and control system 22, which may use a DC converter, may continue to operate efficiently within the lower voltage range. Additionally, an advantage of using the resistance device 44B may be to reduce the range or variance of amperages experienced across the tether 50, which may assist with reducing voltage variances across the tether 50, which may be caused by resistance along the wire or conductor within the tether 50. By reducing variances, potentially longer tethers 50 may be used without increasing the diameter of the conductor therein.

FIG. 6 is a flowchart 100 illustrating a method for powering an aerial vehicle carrying lights, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, an aerial vehicle has a plurality of light-emitting diodes (LEDs) mounted thereto. A tether is connected between the aerial vehicle and a power source located remote from the aerial vehicle (block 104). A quantity of electrical power is transmitted through the tether, wherein the quantity of electrical power is transmitted through at least one electrical circuit carried by the aerial vehicle, wherein the at least one electrical circuit has a DC buck converter electrically in series with at least a portion of the plurality of LEDs (block 106). Any number of additional steps, functions, processes, or variants thereof may be included in the method, including any disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included hemin within the scope of this disclosure and the present disclosure and protected by the following claims.

What is claimed is:

1. An aerial vehicle electrical power system comprising:
    an aerial vehicle;
    a plurality of light-emitting diodes (LEDs) carried by the aerial vehicle;
    at least one electrical circuit carried by the aerial vehicle, wherein the at least one electrical circuit has a DC buck converter electrically in series with at least a portion of the plurality of LEDs;
    at least one amperage boost regulator in parallel with the DC buck converter; and
    a tether connected between the aerial vehicle and a power source positioned remote from the aerial vehicle, wherein electrical power is transmitted to the aerial vehicle and at least a portion of the plurality of LEDs through the tether, wherein when the DC buck converter draws greater amperage, the amperage boost regulator draws less amperage thereby decreasing amperage variances across the tether, and wherein when the DC buck converter draws less amperage, the amperage boost regulator draws greater amperage thereby decreasing amperage variances across the tether.

2. The system of claim 1, wherein the amperage boost regulator comprises at least one diode.

3. The system of claim 1, wherein when the DC buck converter draws greater amperage and the amperage boost regulator draws less amperage thereby decreasing amperage variances across the tether, the amperage boost regulator decreases or eliminates flickering of the plurality of LEDs.

4. The system of claim 1, further comprising at least one electronic device in series with the DC buck converter electrically in parallel with the amperage boost regulator, wherein the at least one electronic device receives decreased amperage variances.

5. The system of claim 4, wherein the at least one electronic device further comprises at least one LED.

6. An aerial vehicle electrical power system comprising:
    an aerial vehicle;
    a plurality of light-emitting diodes (LEDs) carried by the aerial vehicle;
    at least one electrical circuit carried by the aerial vehicle, wherein the at least one electrical circuit has a DC buck converter electrically in parallel with an amperage boost regulator, wherein the amperage boost regulator regulates voltage variances across the parallel circuit formed between the amperage boost regulator and the DC buck converter by at least one of:
        drawing less amperage when the DC buck converter draws greater amperage, thereby decreasing amperage variances across the tether; or
        drawing greater amperage when the DC buck converter draws less amperage, thereby decreasing amperage variances across the tether; and
    a tether connected between the aerial vehicle and a power source positioned remote from the aerial vehicle, wherein electrical power is transmitted to the aerial vehicle and at least a portion of the plurality of LEDs through the tether.

7. The system of claim 6, wherein the amperage boost regulator comprises at least one diode.

8. The system of claim 6, wherein when the DC buck converter draws greater amperage and the amperage boost regulator draws less amperage thereby decreasing amperage variances across the tether, the amperage boost regulator decreases or eliminates flickering of the plurality of LEDs.

9. The system of claim 6, further comprising at least one electronic device in series with the DC buck converter electrically in parallel with the amperage boost regulator, wherein the at least one electronic device receives decreased amperage variances.

10. The system of claim 9, wherein the at least one electronic device further comprises at least one LED.

11. The system of claim 7, wherein the amperage boost regulator initiates regulation of amperage variances across the at least one electrical circuit when a forward voltage of the at least one diode is exceeded.

12. A method for powering an aerial vehicle carrying lights, the method comprising:
    providing an aerial vehicle having a plurality of light-emitting diodes (LEDs) mounted thereto;
    connecting a tether between the aerial vehicle and a power source located remote from the aerial vehicle surface;
    providing at least one electrical circuit carried by the aerial vehicle, wherein the at least one electrical circuit has a DC buck converter electrically in series with at least a portion of the plurality of LEDs;
    electrically connecting at least one resistance device in parallel to the DC buck converter; and
    transmitting a quantity of electrical power through the tether, wherein the quantity of electrical power is transmitted through the at least one electrical circuit carried by the aerial vehicle, wherein the at least one resistance device regulates amperage variances across the at least one electrical circuit,
    wherein the at least one resistance device further comprises an amperage boost regulator, and further comprising at least one electronic device in series with the DC buck converter electrically in parallel with the amperage boost regulator, wherein the at least one electronic device receives decreased amperage variances.

13. The method of claim 12, wherein the amperage boost regulator regulates voltage variances across the parallel circuit formed between the amperage boost regulator and the DC buck converter by at least one of:
    drawing less amperage when the DC buck converter draws greater amperage, thereby decreasing amperage variances across the tether; or
    drawing greater amperage when the DC buck converter draws less amperage, thereby decreasing amperage variances across the tether.

14. The method of claim 12, wherein the amperage boost regulator comprises at least one diode.

15. The method of claim 12, further comprising decreasing or eliminating flickering of the plurality of LEDs when the DC buck converter draws greater amperage and the amperage boost regulator draws less amperage.

16. The method of claim 12, wherein the at least one electronic device further comprises at least one LED.

17. The method of claim 14, wherein the amperage boost regulator initiates regulation of amperage variances across the at least one electrical circuit when a forward voltage of the at least one diode is exceeded.

* * * * *